United States Patent
Tojo

(10) Patent No.: US 9,237,266 B2
(45) Date of Patent: Jan. 12, 2016

(54) IMAGE PICKUP APPARATUS AND METHOD FOR DETECTING AN ENTRANCE OR EXIT EVENT OF AN OBJECT IN A FRAME IMAGE AND MEDIUM STORING A PROGRAM CAUSING A COMPUTER TO FUNCTION AS THE APPARATUS

(75) Inventor: Hiroshi Tojo, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 491 days.

(21) Appl. No.: 12/902,639

(22) Filed: Oct. 12, 2010

(65) Prior Publication Data

US 2011/0090358 A1   Apr. 21, 2011

(30) Foreign Application Priority Data

Oct. 19, 2009 (JP) .................................. 2009-240655

(51) Int. Cl.
*H04N 5/225* (2006.01)
*H04N 5/76* (2006.01)
*H04N 5/232* (2006.01)
(Continued)

(52) U.S. Cl.
CPC ............ *H04N 5/232* (2013.01); *G06K 9/00771* (2013.01); *H04N 5/23206* (2013.01); *H04N 7/18* (2013.01)

(58) Field of Classification Search
CPC .......... G06K 9/00771; G06K 9/00335; G06K 2009/3291; G06K 9/00342; G06T 2207/10016; G06T 2207/30196; G06T 2207/30232; G06T 2207/30236; H04N 7/188; G08B 13/19608; G08B 13/196; G08B 13/19602

USPC .......... 348/143–160, 169–172, 231.5, 231.3; 382/103, 115–124

See application file for complete search history.

(56) References Cited

U.S. PATENT DOCUMENTS 5,969,755 A * 10/1999 Courtney ...................... 348/143
6,545,705 B1 * 4/2003 Sigel et al. .................... 348/157
(Continued)

FOREIGN PATENT DOCUMENTS

JP   2003-009130 A   1/2003
JP   2007-025950     2/2007
(Continued)

OTHER PUBLICATIONS

Japanese Office Action dated Nov. 19, 2013, issued in counterpart Japanese Application No. 2009-240655, and English-language translation thereof.

*Primary Examiner* — Chia-Wei A Chen
(74) *Attorney, Agent, or Firm* — Fitzpatrick, Cella, Harper & Scinto

(57) ABSTRACT

An information processing apparatus includes: an object detection unit to detect an object included in a frame image based on a feature amount of the frame image, and generate and output object information concerning the detected object; an event detection unit to detect an event of the object based on the object information output by the object detection unit, and generate and output event concern information concerning the detected event of the object; and a transmission unit to transmit the frame image, the event concern information, concerning the frame image, output by the event detection unit, and time information concerning the frame image, as associating them with others. Thus, even in a case where event detection timing and event occurrence timing are different from each other, it is possible to perform a display by which a user can easily confirm the event.

6 Claims, 16 Drawing Sheets

(51) Int. Cl.
*G06K 9/00* (2006.01)
*H04N 7/18* (2006.01)

(56) References Cited

U.S. PATENT DOCUMENTS

| | | | |
|---|---|---|---|
| 6,647,157 B1 | 11/2003 | Shiiyama et al. | |
| 6,731,789 B1 | 5/2004 | Tojo | |
| 6,816,184 B1 * | 11/2004 | Brill et al. | 348/143 |
| 7,023,469 B1 * | 4/2006 | Olson | 348/152 |
| 7,071,974 B2 | 7/2006 | Tojo | |
| 7,099,829 B2 * | 8/2006 | Gomez | 704/275 |
| 7,272,269 B2 | 9/2007 | Tojo et al. | |
| 7,583,815 B2 * | 9/2009 | Zhang et al. | 382/103 |
| 7,599,960 B2 * | 10/2009 | Yamamoto et al. | 1/1 |
| 7,623,259 B2 | 11/2009 | Tojo | |
| 7,760,908 B2 * | 7/2010 | Curtner et al. | 382/103 |
| 7,876,352 B2 * | 1/2011 | Martin | 348/157 |
| 7,996,771 B2 * | 8/2011 | Girgensohn et al. | 715/723 |
| 8,094,170 B2 * | 1/2012 | Kato et al. | 345/647 |
| 8,314,854 B2 * | 11/2012 | Yoon et al. | 348/231.3 |
| 8,576,284 B2 | 11/2013 | Konno et al. | |
| 2002/0103512 A1 * | 8/2002 | Echauz et al. | 607/9 |
| 2004/0012623 A1 * | 1/2004 | Yashiro et al. | 345/723 |
| 2004/0234169 A1 | 11/2004 | Tojo | |
| 2004/0246336 A1 * | 12/2004 | Kelly et al. | 348/143 |
| 2005/0027745 A1 | 2/2005 | Sohma et al. | |
| 2005/0124389 A1 * | 6/2005 | Yang | 455/574 |
| 2005/0163346 A1 * | 7/2005 | van den Bergen et al. | 382/103 |
| 2008/0018738 A1 * | 1/2008 | Lipton et al. | 348/143 |
| 2008/0123900 A1 * | 5/2008 | Ma et al. | 382/103 |
| 2008/0151051 A1 | 6/2008 | Konno et al. | |
| 2008/0198231 A1 * | 8/2008 | Ozdemir et al. | 348/159 |
| 2008/0211907 A1 * | 9/2008 | Kelly et al. | 348/143 |
| 2008/0218591 A1 * | 9/2008 | Heier et al. | 348/150 |
| 2009/0052739 A1 * | 2/2009 | Takahashi et al. | 382/103 |
| 2009/0208054 A1 * | 8/2009 | Angell et al. | 382/103 |
| 2010/0195865 A1 * | 8/2010 | Luff | 382/100 |
| 2011/0052003 A1 * | 3/2011 | Cobb et al. | 382/103 |
| 2011/0115634 A1 * | 5/2011 | Monden | 340/573.1 |
| 2011/0125327 A1 * | 5/2011 | Sankai | 700/275 |

FOREIGN PATENT DOCUMENTS

| | | |
|---|---|---|
| JP | 2007-049378 | 2/2007 |
| JP | 2008-011056 A | 1/2008 |
| JP | 2008-152736 A | 7/2008 |

* cited by examiner

FIG. 7

| FRAME META DATA | FRAME NUMBER |
| --- | --- |
| | THE NUMBER OF OBJECTS |
| OBJECT META DATA | EVENT ID |
| | CIRCUMSCRIBED RECTANGLE COORDINATES (LEFT, UPPER, RIGHT, LOWER) |
| | EXISTING TIME |
| | .... |

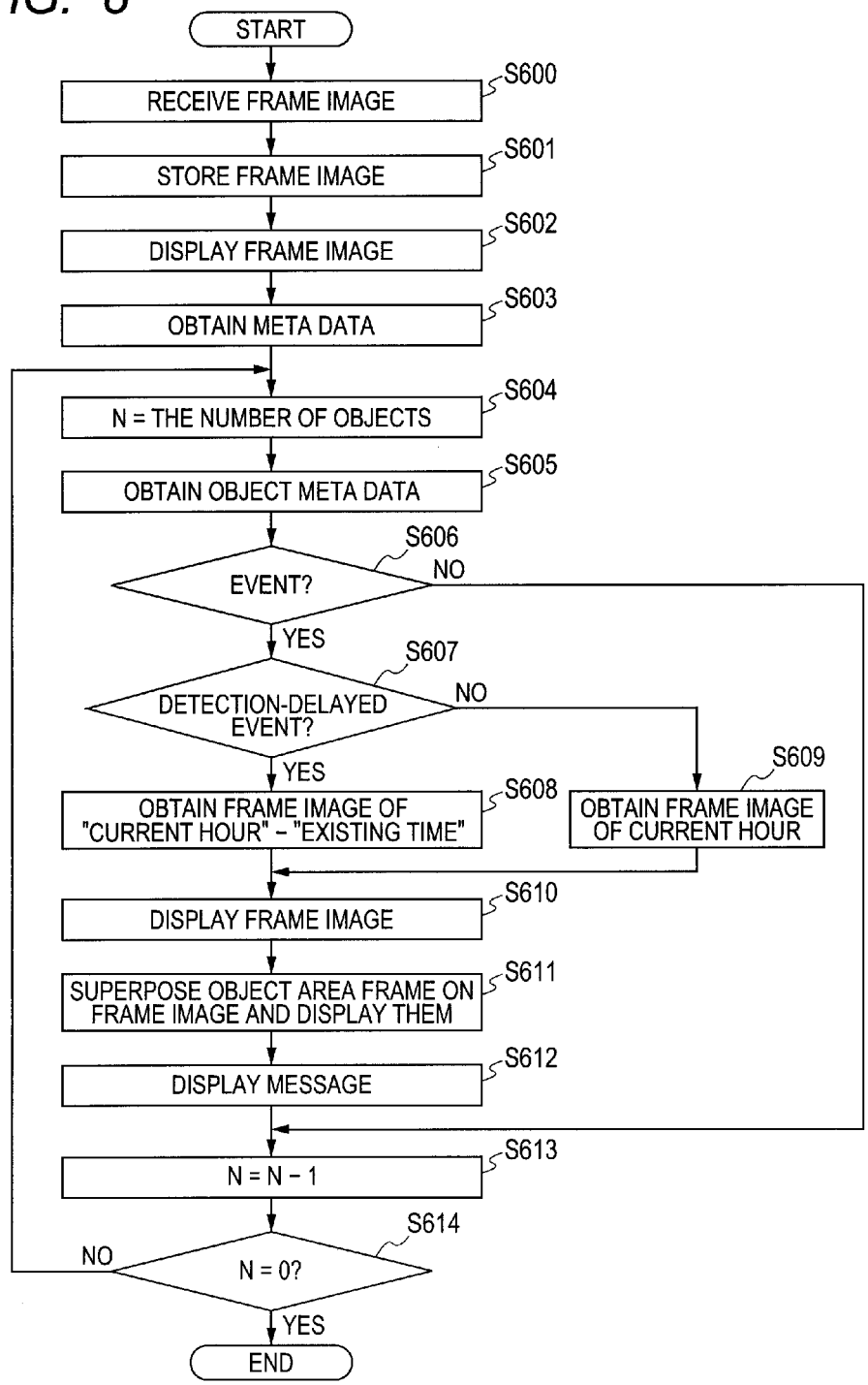

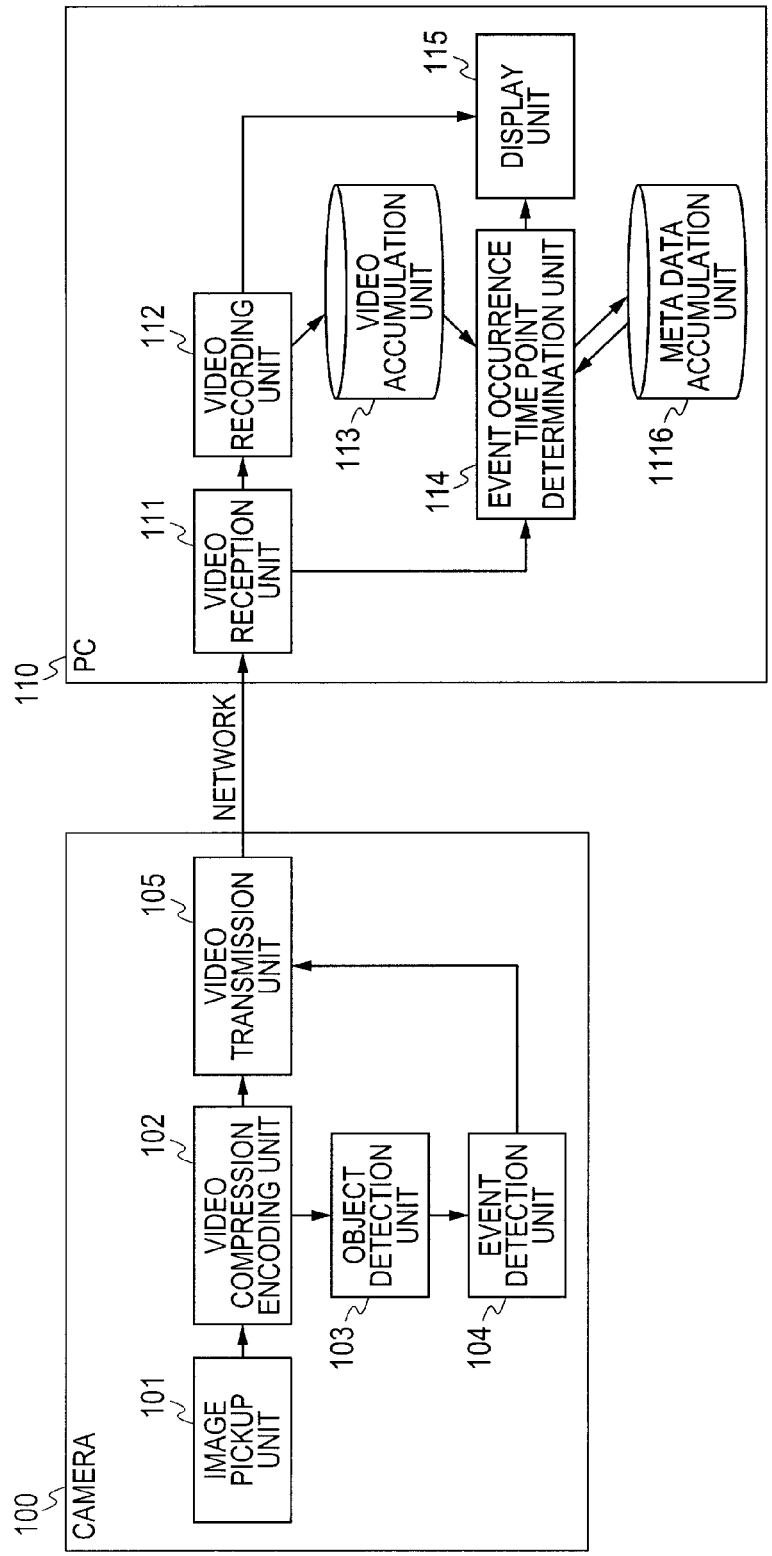

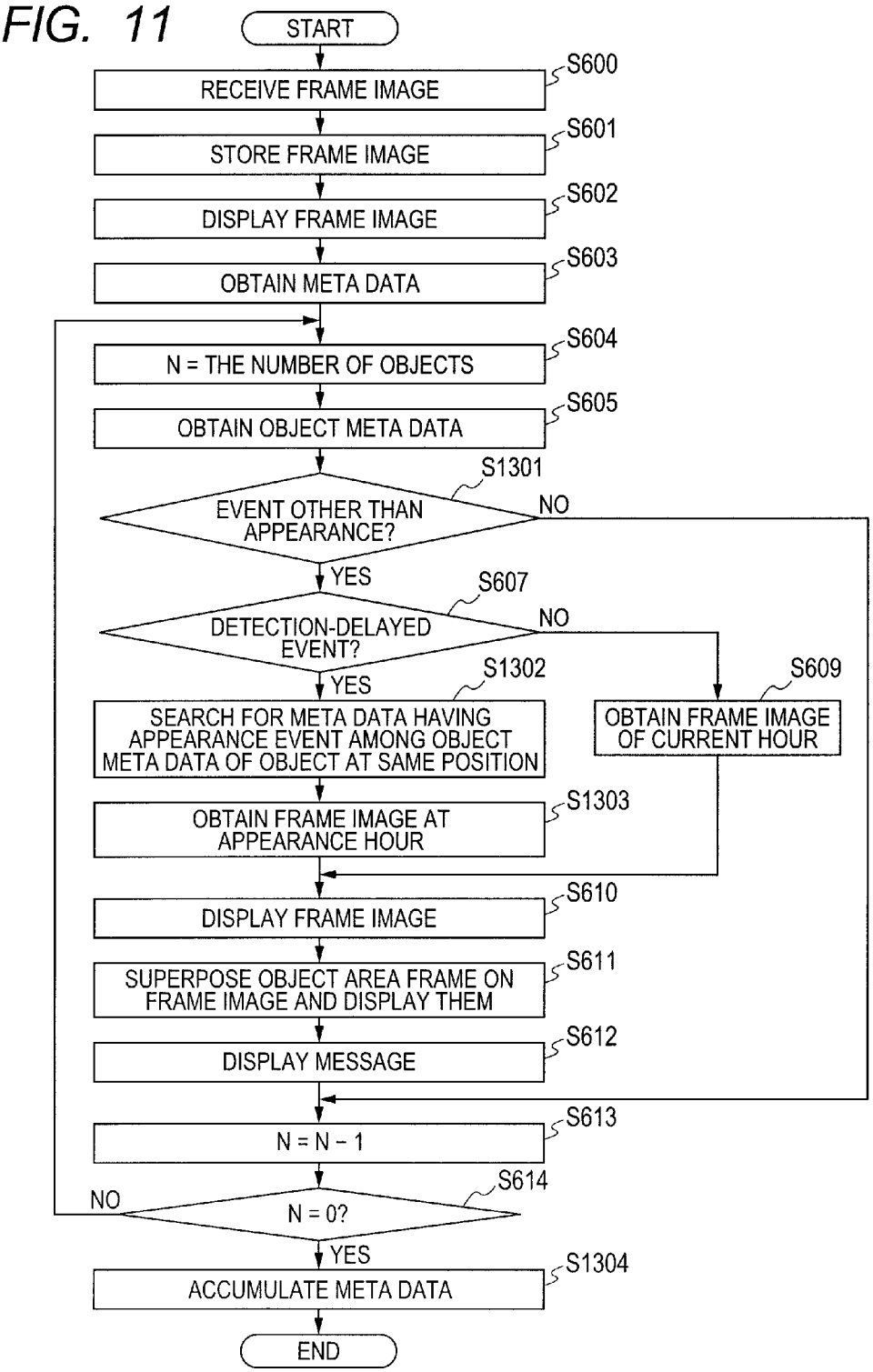

IMAGE PICKUP APPARATUS AND METHOD FOR DETECTING AN ENTRANCE OR EXIT EVENT OF AN OBJECT IN A FRAME IMAGE AND MEDIUM STORING A PROGRAM CAUSING A COMPUTER TO FUNCTION AS THE APPARATUS

BACKGROUND OF THE INVENTION

1. Field of the Invention

The present invention relates to an image pickup apparatus, an information processing apparatus, and an information processing method.

2. Description of the Related Art

Conventionally, a digital monitoring system using a network camera and a computer has been rapidly introduced. That is, the digital monitoring system like this is constituted by the network camera, a video recording apparatus for recording a video produced by the network camera, and a viewer for reproducing a live video produced by the network camera and a recorded video recoded by the video recording apparatus. Here, the viewer has a function of displaying a phenomenon of the system and a phenomenon occurred in the video, as events.

For example, in Japanese Patent Application Laid-Open 2007-025950, an abnormality is detected by analyzing a video produced by a camera, and, if the abnormality is detected, an informing signal or a message is output. Further, in Japanese Patent Application Laid-Open 2007-049378, an abnormality is detected by a sensor, a camera related to the sensor is specified based on layout information indicating the relation between the sensor and the camera, and a current video produced by the specified camera is displayed.

However, for example, in a case where a phenomenon that a certain person misplaced or mislaid a bag or the like is detected as an event, such a problem as described below occurs. That is, only if the person goes away from a place where the bag has been put on, a user of the system can actually detect such misplacement of the bag. In this connection, even if the video obtained at the time when the misplacement of the bag is detected can be displayed by such conventional techniques as described above, it may be difficult for the user to discriminate which person misplaced the bag. According to circumstances, there is a possibility that the person who is the owner of the misplaced bag has left. Like this, if there is a gap between the time at which the event can be detected and the time at which the event occurs (in this example, at a moment that the person leaves from the bag), it is impossible in the conventional technique to perform a display which enables the user to confirm the occurrence of the event.

The present invention has been completed in consideration of the above-described conventional problem, and aims to perform the display that enables the user to confirm the occurrence of the event even if the time at which the event is detected is different from the time at which the event occurs.

SUMMARY OF THE INVENTION

Consequently, an image pickup apparatus according to the present invention is characterized by comprising: an object detection unit configured to detect an object included in a frame image on the basis of a feature amount of the frame image, and generate and output object information concerning the detected object; an event detection unit configured to detect an event of the object on the basis of the object information output by the object detection unit, and generate and output event concern information concerning the detected event of the object; and a transmission unit configured to transmit the frame image, the event concern information, concerning the frame image, output by the event detection unit, and time information concerning the frame image, as associating the frame image, the event concern information and the time information with others.

Further, an information processing apparatus according to the present invention is characterized by comprising: a reception unit configured to receive a frame image, event concern information, associated with the frame image, concerning an event of an object included in the frame image, and time information concerning the frame information; a storage control unit configured to store in a storage apparatus the frame image and the time information received by the reception unit, as associating the frame image and the time information with each other; an obtaining unit configured to determine, on the basis of the event concern information received by the reception unit, an event occurrence time concerning occurrence of the event included in the corresponding frame image, and obtain from the storage apparatus the frame image corresponding to the determined event occurrence time; and a display control unit configured to display on a display apparatus the frame image obtained by the obtaining unit.

Furthermore, an information processing apparatus according to the present invention is characterized by comprising: an object detection unit configured to detect an object included in a frame image on the basis of a feature amount of the frame image, and generate and output object information concerning the detected object; an event detection unit configured to detect an event of the object on the basis of the object information output by the object detection unit, and generate and output event concern information concerning the detected event of the object; a storage control unit configured to store in a storage apparatus the frame image and time information concerning the frame image, as associating the frame image and the time information with each other; an obtaining unit configured to determine, on the basis of the event concern information output by the event detection unit, an event occurrence time concerning occurrence of the event included in the corresponding frame image, and obtain from the storage apparatus the frame image corresponding to the determined event occurrence time; and a display control unit configured to display on a display apparatus the frame image obtained by the obtaining unit.

Further features and aspects of the present invention will become apparent from the following detailed description of exemplary embodiments with reference to the attached drawings.

BRIEF DESCRIPTION OF THE DRAWINGS

FIG. 7 is a diagram indicating an example of meta data.

FIG. 8 is a flow chart for describing a process to be performed by the PC according to the first embodiment.

FIG. 10 is a block diagram illustrating an example of a system configuration of an image processing system according to the second embodiment, and functional constitutions of apparatuses included in the image processing system.

FIG. 11 is a flow chart for describing a process to be performed by the PC according to the second embodiment.

DESCRIPTION OF THE EMBODIMENTS

Hereinafter, exemplary embodiments of the present invention will be described with reference to the attached drawings.

Figure 1:
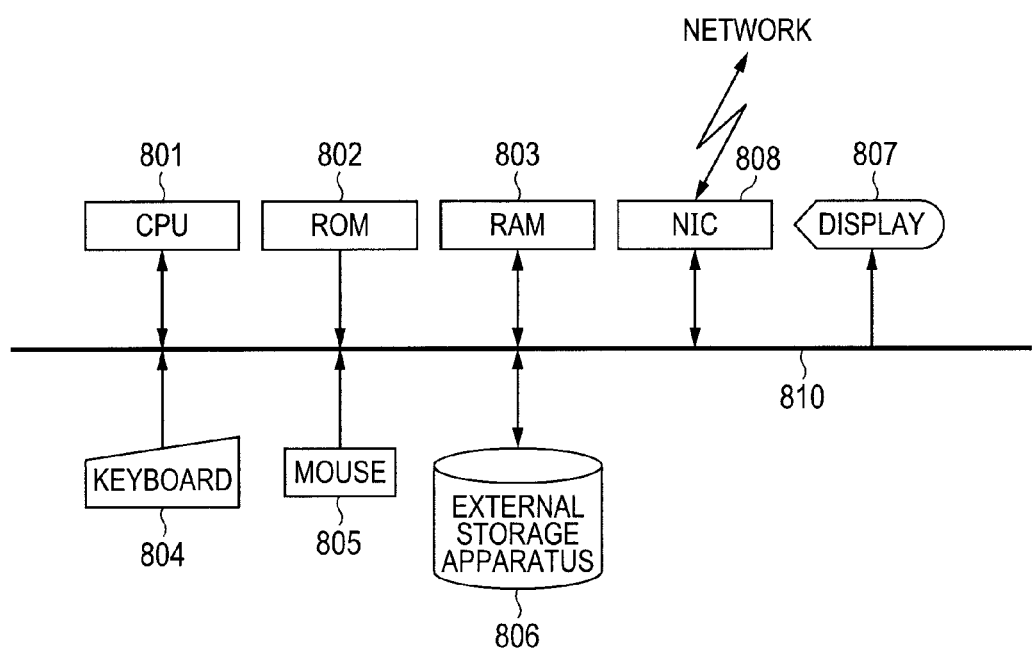
FIG. 1 is a block diagram illustrating an example of a hardware constitution of a PC (personal computer).
Figure 2:
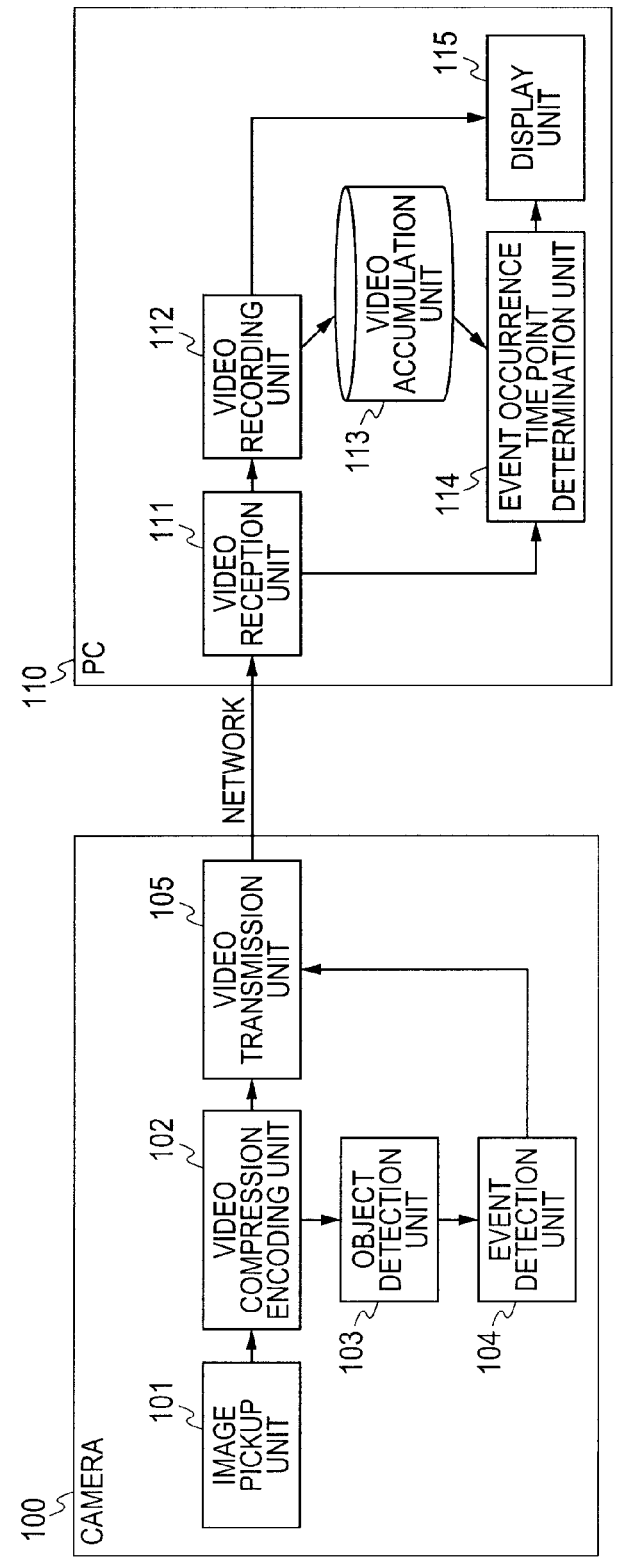
FIG. 2 is a block diagram illustrating an example of a system configuration of an image processing system according to the first embodiment, and functional constitutions of apparatuses included in the image processing system.

An image processing system according to the first embodiment of the present invention includes, as illustrated in FIG. 2, a camera 100, and a PC 110, which is an example of an information processing apparatus. Hereinafter, an example of a hardware constitution of the PC 110 will be described with reference to FIG. 1. That is, FIG. 1 is the block diagram illustrating the example of the hardware constitution of the PC.

A CPU (central processing unit) 801 performs various control processes of the PC 110. A ROM (read only memory) 802 stores therein a boot program to be performed when activating the PC 110, and various data. A RAM (random access memory) 803 stores therein control programs when the CPU 801 performs these programs, and also provides a working area when the CPU 801 performs the various control processes. Further, a keyboard 804 and a mouse 805 provide a user with an operation environment for inputting various information.

An external storage apparatus 806 is constituted by a hard disk, a flexible disk, an optical disk, a magnetic disk, a magnetooptical disk, a magnetic tape, or the like. However, if the ROM 802 is set to store therein all of the control program and the various data, the external storage apparatus 806 is not necessarily an essential component as the hardware of the PC 110. A display 807 is constituted by a display unit or the like to display a processed result and the like to the user. A network interface (indicated as an NIC (network interface card) in FIG. 1) 808 enables communication between the camera 100 and the PC 110 on a network through, e.g., a LAN (local area network) cable or the like. Further, a bus 810 is used to mutually connect the respective components as described above.

If the programs (control programs) stored in the external storage apparatus 806 or the like are read to the RAM 803 or the like and then performed by the CPU 801, the functions of the PC 110 according to the present embodiment and the processes to be performed by the PC 110 as indicated by later-described flow charts are achieved.

Incidentally, a figure illustrating in detail a hardware constitution of the camera 100 in the present embodiment is omitted. However, it should be noted that, as well as the PC 110, the camera 100 is constituted by a CPU, a RAM, a ROM, a network interface and the like. In addition, the camera 100 is equipped with an imaging lens (image pickup lens), an imaging sensor (image pickup sensor), and the like. If the programs stored in the ROM or the like of the camera 100 are read to the RAM of the camera 100 and then performed by the CPU of the camera 100, the functions of the camera 100 according to the present embodiment and the processes to be performed by the camera 100 as indicated by later-described flow charts are achieved.

FIG. 2 is a block diagram illustrating an example of a system configuration of the image processing system according to the first embodiment, and functional constitutions of the apparatuses included in the image processing system.

In the image processing system as illustrated in FIG. 2, the camera 100 and the PC 110 can communicate with each other through a network.

The camera 100 includes, as its functional constitution, an image pickup unit 101, a video compression encoding unit 102, an object detection unit 103, an event detection unit 104, and a video transmission unit 105.

Further, the image pickup unit 101 is constituted by the imaging lens, and the imaging sensor such as a CCD (charge coupled device), a CMOS (complementary metal-oxide semiconductor) sensor or the like.

The video compression encoding unit 102 performs, frame by frame, a compression encoding process to the image data obtained by the image pickup unit 101, at predetermined time intervals.

The object detection unit 103 detects an object on the basis of a feature amount generated by the video compression encoding unit 102 during the compression.

The event detection unit 104 detects an event by analyzing the result detected by the object detection unit 103, and outputs the detected event as meta data.

The video transmission unit 105 adds the meta data obtained as the result of the detection by the event detection unit 104 to the frame image subjected to the compression encoding process by the video compression encoding unit 102, and transmits the obtained frame image. That is, the frame image is transmitted from the camera 100 to the PC 110 as packet data of an http protocol through the network such as the LAN cable or the like. Here, it should be noted that the protocol to be used when transmitting the packet data is not limited to the http protocol.

The PC 110 includes, as its functional constitution, a video reception unit 111, a video recording unit 112, a video accumulation unit 113, an event occurrence time point determination unit 114, and a display unit 115.

The video reception unit 111 receives the packet data of the frame image, through the network interface 808 on the PC 110. Then, the video reception unit 111 generates the frame image based on the received packet data, and outputs the generated frame image to the video recording unit 112 together with a given time stamp.

The video recording unit 112 sequentially stores, together with the time stamp, the received frame image in the video accumulation unit 113 constituted by the external storage apparatus 806 or the RAM 803.

The event occurrence time point determination unit 114 obtains the meta data from the frame image received by the video reception unit 111, and determines an event occurrence time point of the event on the basis of the obtained meta data. Further, the event occurrence time point determination unit 114 obtains the frame image from the video accumulation unit 113 on the basis of the determined event occurrence time point, and outputs the obtained frame image to the display unit 115.

The display unit 115 displays, on the display 807, the frame image which is being recorded by the video recording unit 112, and the frame image at the time when the event occurred that is input from the event occurrence time point determination unit 114. Thus, the user is provided with these images through the display 807.

Figure 3:
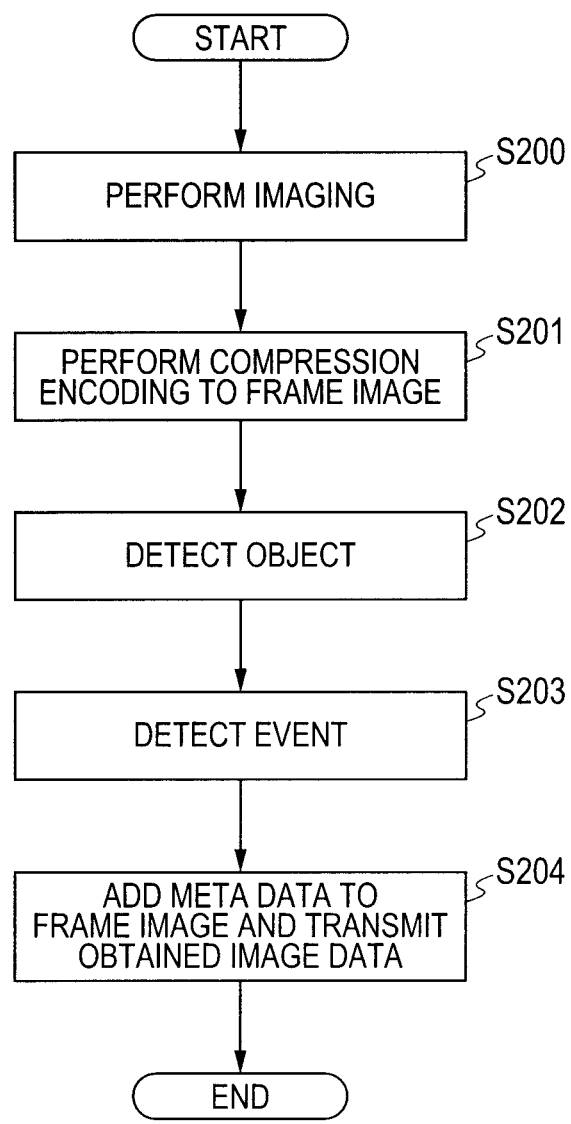
FIG. 3 is a flow chart for describing a process to be performed by a camera according to the first embodiment.

Subsequently, the process to be performed by the camera 100 will be described with reference to the flow chart illustrated in FIG. 3. Namely, FIG. 3 is the flow chart for describing the process to be performed by the camera according to the first embodiment.

Initially, in a step S200, the image pickup unit 100 performs imaging to obtain the frame image.

Next, in a step S201, the video compression encoding unit 102 performs the compression encoding process to the frame image with a proper compression encoding method. Here, the video compression encoding unit 102 may select, as the compression encoding method, any one of a JPEG (Joint Photographic Experts Group) method, an MPEG-1 (Motion Picture Experts Group 1) method, an MPEG-2 method, an MPEG-4 method, and the like. However, it is assumed that, in the present embodiment, the video compression encoding unit 102 performs the compression encoding process in the JPEG method.

Next, in a step S202, the object detection unit 103 detects the object based on the feature amount generated by the video compression encoding unit 102 during the compression, and then outputs the detected object as object information. Incidentally, the detail of such an object detection process will be described with reference to later-described FIG. 4.

Next, in a step S203, the event detection unit 104 detects the phenomenon (event) such as intrusion, misplacement, carrying-away or the like, by analyzing the object information obtained as the result of the detection by the object detection unit 103, and then outputs the detected result as the meta data.

Next, in a step S204, the video transmission unit 105 adds the meta data, obtained as the result of the process by the event detection unit 104, to the frame image subjected to the compression encoding process, and transmits the obtained frame image to the network. For example, the video transmission unit 105 adds the meta data to a header area of the frame image, and then transmits the obtained frame image. Incidentally, in such a case, a later-described frame number is used as an example of time information.

How to add the meta data to the frame image is not limited to such a method as described above. It is possible to also adopt a method capable of adding the meta data to the frame image as synchronizing the frame image and the meta data with each other (that is, as obtaining correspondence between the frame image and the meta data). For example, the video transmission unit 105 may separately transmit the frame image and the meta data after giving the time stamp to each of the frame image and the meta data. Thus, the PC 110 at the reception side can obtain the meta data suitably corresponding to the frame image by referring to the given time stamp. In such a case, the time stamp is used as an example of the time information.

Figure 4:
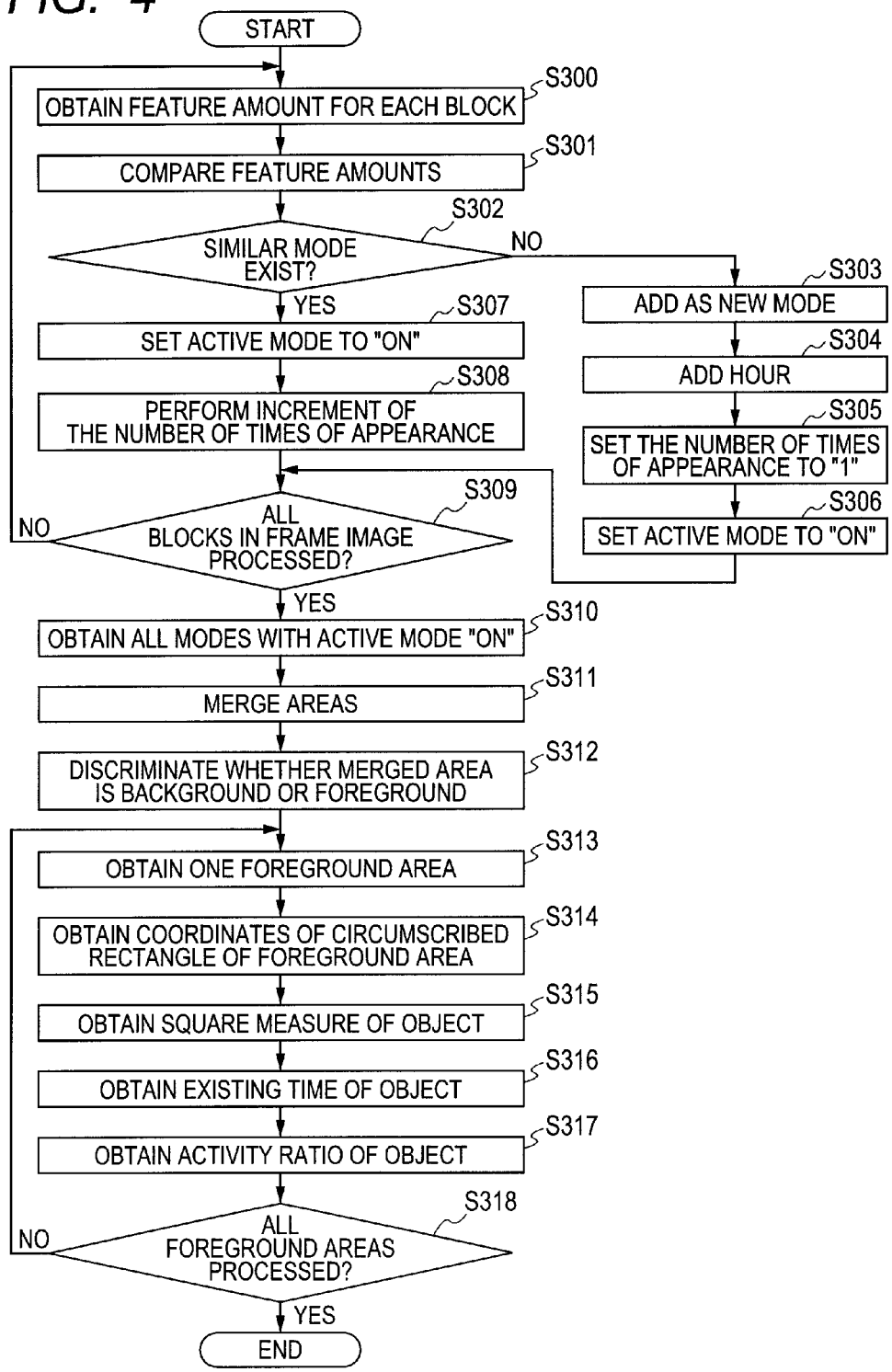
FIG. 4 is a flow chart indicating an example of a process to be performed by an object detection unit.
Figure 5:
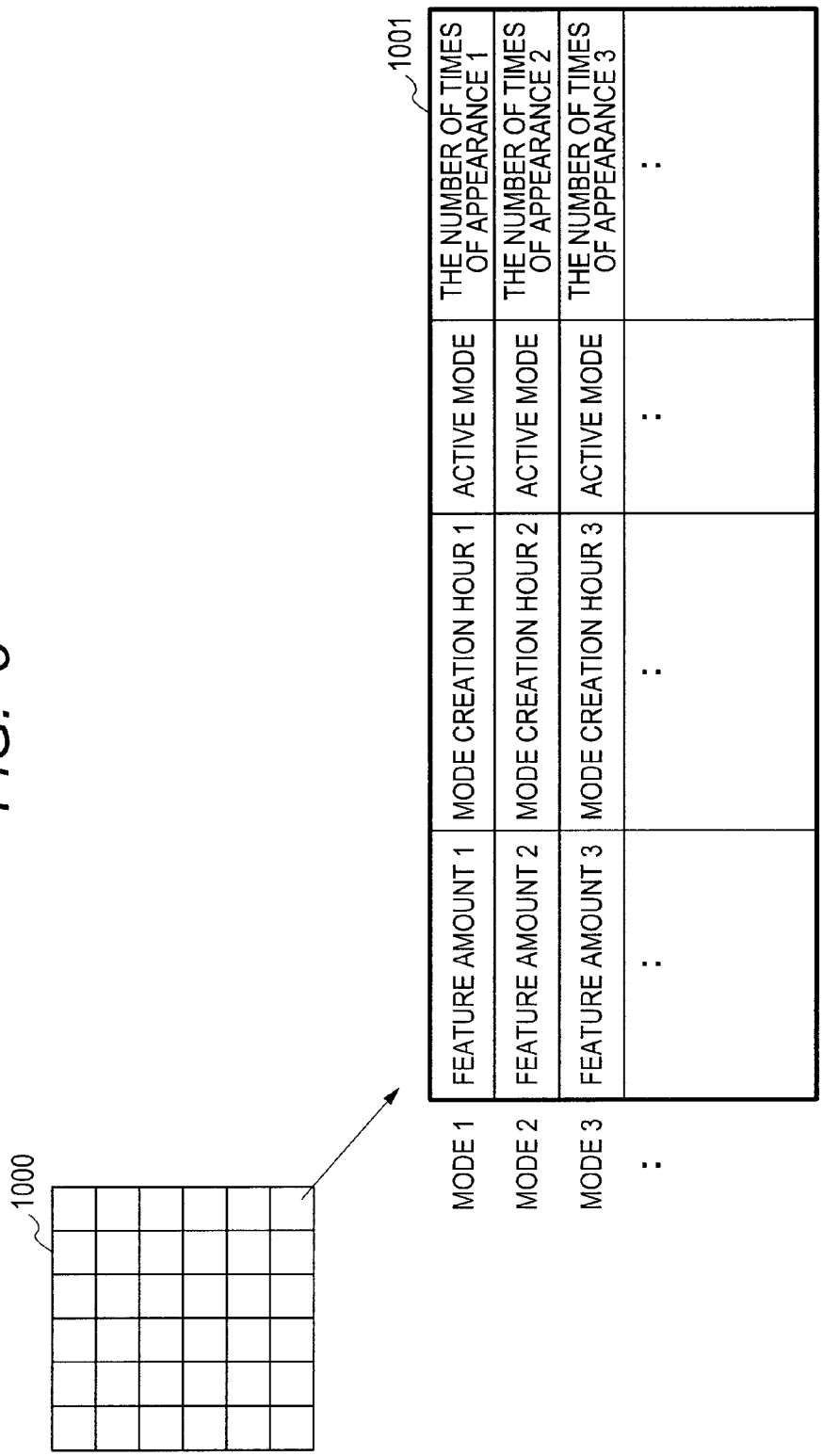
FIG. 5 is a diagram for describing various modes.

The detail of the process to be performed by the object detection unit 103 will be described with reference to FIGS. 4 and 5. That is, FIG. 4 is the flow chart indicating the process to be performed by the object detection unit 103, and FIG. 5 is the diagram for describing various modes of the object detection unit 103.

The object detection unit 103 sets plural initial frame images as backgrounds and then obtains differences between the initial frame images and a current frame image, thereby detecting an object. In the present embodiment, the camera 100 has stored the feature amounts of the plural frame images respectively as plural states so that such a change in a case where trees tremble in breeze can be set as the background. Here, it should be noted that each of these states is called a mode. That is, the camera 100 holds the plural modes, and compares the plural held modes with the feature amount of the current frame image, thereby determining whether the detected object is a newly appeared object or the background.

Initially, in a step S300, the object detection unit 103 obtains the feature amount for each block from the video compression encoding unit 102, so as to process the images in units of block. Here, in the JPEG method, color information of the image is converted into data in a YUV color space. Then, the object detection unit 103 divides the overall image into blocks each consisting of 8 pixels×8 pixels (see a block 1000 in FIG. 5). Further, the object detection unit 103 performs DCT (discrete cosine transform: i.e., frequency analysis) to each block. Then, the object detection unit 103 performs quantization so that an obtained value decreases while becoming a higher frequency component. After then, Huffman encoding is performed. Here, the object detection unit 103 obtains a DCT coefficient quantized before the Huffman encoding, as the feature amount.

Next, in a step S301, the object detection unit 103 compares the modes (a block 1001 illustrated in FIG. 5) which are the feature amounts already stored as the backgrounds with the obtained feature amount. As described above, since the plural modes can be held, the object detection unit 103 compares the obtained feature amount with all of the already held modes. Here, a method of performing such comparison is not specifically limited. For example, the object detection unit 103 may perform the comparison by using the sum of the differences of the luminance components. More specifically, if it is assumed that a k-th coefficient of the luminance component is Cy_k, a current frame is i, and a frame in the mode is m, then the summation of the differences Yk from k=0 to k=N (i.e., from a low frequency to a high frequency) can be expressed by the following equation (1).

$$\sum_{K=0}^{N} Y_k = C_{y\_ki} - C_{y\_km} \quad (1)$$

Here, if this value is equal to or higher than a predetermined threshold, the object detection unit 103 determines that the features are not similar. Of course, the object detection unit 103 may further obtain the sums of the differences also for the color components U and V respectively as expressed by the following equations (2) and (3) and determine that the features are not similar if at least one of these values is equal to or higher than the predetermined threshold.

$$\sum_{K=0}^{N} U_k = C_{U\_ki} - C_{U\_km} \quad (2)$$

$$\sum_{K=0}^{N} V_k = C_{V\_ki} - C_{V\_km} \quad (3)$$

Next, in a step S302, the object detection unit 103 determines whether or not a similar mode exists, based on the comparison result in the step S301.

Next, in a step S303, if the similar mode does not exist, the object detection unit 103 determines that the target mode is equivalent to a new state, and thus adds it as a new mode. Here, as indicated in the block 1001 illustrated in FIG. 5, each mode includes a feature amount (DCT coefficient), a mode creation hour, an active mode, and the number of times of appearance. Incidentally, the modes have been stored in, e.g., the ROM, the RAM or the like of the camera 100.

Then, in a step S304, the object detection unit 103 adds, to the added mode, the hour when the mode was created (although the current frame number is used in the present embodiment, an ordinary hour expression such as "xx hours, yy minutes, zz seconds" may of course be used). In a step S305, the object detection unit 103 sets "1" as an initial value of the number of times of appearance to the added mode. Further, in a step S306, the object detection unit 103 sets the active mode to "ON" as an initial value. Here, the state that the mode is active implies that this mode corresponds to the current frame.

After step S306, the method proceeds to step S309, where the object detection unit 103 determines whether or not the processes in the steps S300 to S308 have been performed to all the blocks in the current frame image. If not, then, the object detection unit 103 returns the process to the step S300.

Next, in a step S307, if step S306 determines that the similar mode exists, the object detection unit 103 sets the active mode of the relevant mode to "ON". Then, in a step S308, the object detection unit 103 increments the number of times of appearance.

Then, in a step S309, the object detection unit 103 determines whether or not the processes in the steps S300 to S308 have been performed to all the blocks in the current frame image.

Next, in a step S310, the object detection unit 103 obtains, from the results of the above-described processes, all the modes that the active modes are "ON", with respect to each block.

Next, in a step S311, the object detection unit 103 performs an area merging process to the block being the obtained active mode. That is, if the existing times of the modes for the adjacent blocks are close to each other, the object detection unit 103 performs the area merging process by merging (integrating) the relevant areas into the single area. The object detection unit 103 can obtain the existing time (although the number of the frames is used in the present embodiment, an ordinary time expression such as "xx seconds" may of course be used) by "the current hour (frame number)"−"the mode creation hour (frame number) of each block". The object detection unit 103 determines whether to perform the area merging process based on whether or not the difference between the existing times of the active modes of the respective block is within a predetermined threshold.

Next, in a step S312, the object detection unit 103 discriminates for each of the areas merged in the step S311 whether the relevant area is a background or a foreground (corresponding to a newly appeared object). More specifically, the object detection unit 103 calculates an average value of the existing times of the active modes corresponding to the blocks included in each area. Then, the object detection unit 103 sets the calculated average value of the existing times, which is less than the threshold, to the foreground. That is, the since the background always exists, the average existing time of the area is long. On the contrary, the average existing time of the area concerning the foreground is short.

Next, in a step S313, the object detection unit 103 obtains one area which has been determined as the foreground. Further, the object detection unit 103 performs a process of integrating the information concerning the foreground area and outputting the integrated information as object information (steps S314 to S318). Here, it should be noted that the object information includes coordinates (x1, y1) of the upper left point of a circumscribed rectangle of the object, coordinates (x2, y2) of the lower right point of the circumscribed rectangle, a square measure of the object, an existing time of the object, and an activity ratio of the object.

Next, in the step S314, the object detection unit 103 sets the circumscribed rectangle of the foreground area, and obtains the coordinates of the two points, i.e., the upper left point and the lower right point, of the set circumscribed rectangle.

Next, in the step S315, the object detection unit 103 counts the number of the blocks included in the foreground area, and obtains the square measure of the object based on the counted number.

Next, in the step S316, the object detection unit 103 sets the average existing time of the foreground area as the existing time of the object.

Next, in the step S317, the object detection unit 103 obtains an average of the numbers of times of appearance of the corresponding modes of all the blocks in the foreground area. Then, the object detection unit 103 sets the activity ratio by dividing the obtained average by the existing time. That is, if the object is stationary, it can be considered that the same block resultingly exists for a long time. For this reason, the number of times of appearance (the unit is the number of frames) approaches to the existing time, whereby the activity ratio approaches to "1". Of course, in a case where the object crosses, the existing time and the number of times of appearance approach to each other, whereby the activity ratio approaches to "1". However, the existing time is very short in this case. Therefore, the object detection unit 103 can discriminate the state that the object crosses from the state that the object is stationary. If the object moves about, the existing time is long although the number of times of appearance is small, whereby the activity ratio approaches to "0".

Next, in the step S318, the object detection unit 103 determines whether or not the object information could be created by performing the processes to all the foreground areas. Then, if it is determined that the object information could be created by performing the processes to all the foreground areas, the object detection unit 103 ends the process illustrated in FIG. 4. On the other hand, if it is determined that the object information cannot be created by performing the processes to all the foreground areas, the object detection unit 103 returns the process to the step S313 to obtain one unprocessed foreground area, and then repeat the above-described processes.

Figure 6:
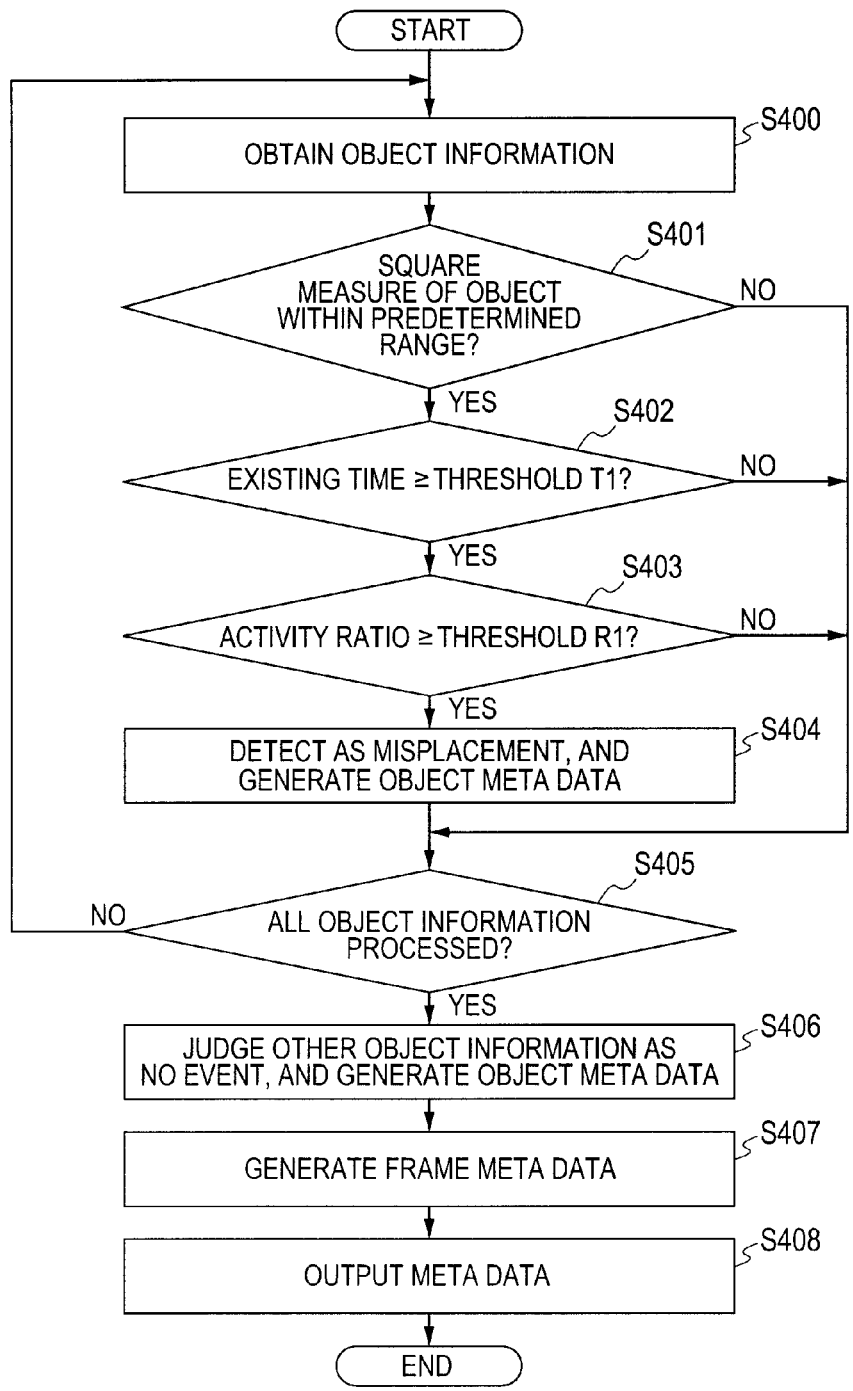
FIG. 6 is a flow chart indicating an example of a process of detecting misplacement as an event.

Subsequently, the detail of the process to be performed by the event detection unit 104 will be described with reference to FIG. 6. That is, FIG. 6 is the flow chart indicating an example of the process of detecting misplacement as an event.

Initially, in a step S400, the event detection unit 104 obtains one object information.

Next, in a step S401, the event detection unit 104 determines whether or not the square measure of the object is within a range of a set size (set value). Then, if it is determined that the square measure of the object is within the range of the set size, the event detection unit 104 considers the object as a misplaced (or mislaid) object. Here, the set value may previously be set in the apparatus. However, since a condition of the size by which the object can be considered as the misplaced object is different according to a set condition or the like of the camera, it is possible to cause a user to freely set the condition of the size.

Next, in a step S402, the event detection unit 104 determines whether or not the existing time in the object information is equal to or longer than a threshold T1. This is because, since the misplaced object is the stationary object, the misplaced object has to exist for a long time.

Next, in a step S403, the event detection unit 104 determines whether or not the activity ratio in the object information is equal to or larger than a threshold R1. This is because, since the misplaced object is the stationary object, the activity ratio has to approach to "1". Incidentally, if the misplaced object is always imaged, "existing time"="threshold T1" is obtained, and also "activity ratio"="1" is obtained. However, for example, if a person passes in front of the misplaced object, the number of times of appearance of the mode corresponding to the misplaced object decreases for the time during which the misplaced object is hidden by the person, whereby the activity ratio, as a result, decreases. After then, if the misplaced object is viewed for a sufficiently long time, the number of times of appearance and the existing time approach each other, whereby "activity ratio">"threshold R1" is obtained. At this time, since relation "existing time">"threshold T1" is given, the event detection unit 104 comes to be able to detect the misplacement.

Next, if all the conditions in the steps S401 to S403 are satisfied, then, in a step S404, the event detection unit 104 detects the misplacement of the object, and generates object meta data on the RAM of the camera 100. Here, the object meta data is one example of the event concern information. Incidentally, the meta data which includes the object meta data and frame meta data may be one example of the event concern information.

Here, the meta data which is output by the event detection unit 104 will be described.

FIG. 7 is a diagram indicating one example of the meta data.

Here, the meta data, which is the meta data for each frame, includes the frame meta data and the object meta data for each object.

Further, the frame meta data includes a current frame number of the frame, and the number of objects included in the frame.

Furthermore, the object meta data includes an event ID which is the information of the event to which the object is relevant, coordinates of the circumscribed rectangle of the object, the existing time, and the like.

Here, the event ID is an ID which has previously been allocated to each classification of event. For example, "ID=1" is defined as "intrusion", "ID=2" is defined as "misplacement", and "ID=3" is defined as "carrying-away". In other words, the ID of the phenomenon (event) detected by the event detection unit 104 is described as the event ID. The coordinates of the circumscribed rectangle of the object, and the existing time are copied from the object information which is the target for the current process. Incidentally, the event ID is one example of event discrimination information, the existing time is one example of existing time information, and the coordinates of the circumscribed rectangle are one example of coordinate information.

The description turns back again to FIG. 6. In a step S405, the event detection unit 104 determines whether or not the determination process (i.e., the step S400 to the step S404) for determining the misplaced object was performed for the overall object information. If it is determined that the determination process was performed for the overall object information, the event detection unit 104 advances the process to a step S406. On the other hand, if it is determined that the determination process is not performed for the overall object information, the event detection unit 104 returns the process to the step S400.

In the step S406, the event detection unit 104 generates, as no event, the object meta data on the RAM of the camera 100 for all the objects other than the object determined as the misplaced object. Incidentally, the event detection unit 104 adds a specific ID such as "0" or the like as the event ID so as to indicate that there is no event. On the other hand, as well as the step S404, the coordinates of the circumscribed rectangle and the existing time are copied from the object information.

Next, in a step S407, the event detection unit 104 generates the frame meta data on the RAM of the camera 100. Further, the event detection unit 104 adds the current hour (frame number) and the number of the objects, as the number of objects.

Next, in a step S408, the event detection unit 104 integrates the frame meta data and all the object meta data, and outputs the integrated data as the meta data.

One example of the process to be performed by the event detection unit 104 is explained as described above. Thus, the event detection unit 104 detects the event by determining whether or not the conditions in the steps S401 to S403 are satisfied, with respect to the coordinates of the circumscribed rectangle, the square measure, the existing time, and the activity ratio being output as the object information. Here, another example is given. That is, in case of the intrusion, the event detection unit 104 causes the user to designate an area such as a door or the like in the screen at which the user wishes to detect the intrusion. Then, the event detection unit 104 detects the intrusion according to a condition as to whether or not the circumscribed rectangle of the object is included in the designated area. Further, the camera 100 may be constituted so that the user can freely set whether or not to perform a process of determining whether or not the above condition is satisfied.

Next, the process to be performed by the PC 110 will be described with reference to FIG. 8. That is, FIG. 8 is the flow chart for describing the process to be performed by the PC according to the first embodiment.

Initially, in a step S600, the video reception unit 111 receives the frame image transmitted from the camera 100 through the network.

Next, in a step S601, the video recording unit 112 stores and accumulates the received frame image in the video accumulation unit 113.

Figure 9A:
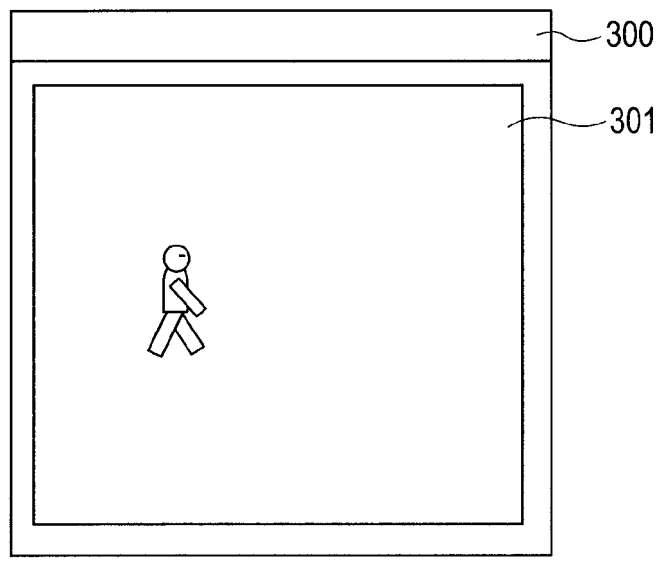
FIGS. 9A and 9B are diagrams respectively illustrating screens.
Figure 9B:
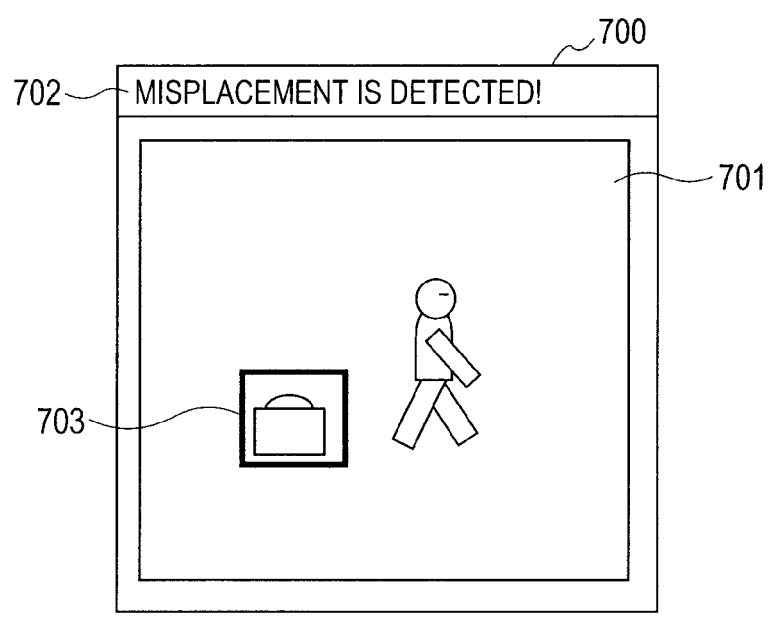

Next, in a step S602, the video recording unit 112 displays the received frame image on the display unit 115. Thus, the user can confirm the video which is currently imaged by the camera. Here, an example of the screen at that time is illustrated in FIG. 9A. Namely, FIGS. 9A and 9B are the diagrams respectively illustrating examples of the screens. More specifically, the example illustrated in FIG. 9A includes a main window 300, and an area 301 in which the current frame image obtained by the camera 100 is displayed.

Next, in a step S603, the event occurrence time point determination unit 114 obtains the meta data from the header portion of the frame image received by the video reception unit 111.

Next, in a step S604, the event occurrence time point determination unit 114 sets the value of the number of objects in the frame meta data of the meta data to "N".

Next, in a step S605, the event occurrence time point determination unit 114 obtains one object meta data of the meta data in rank order.

Next, in a step S606, the event occurrence time point determination unit 114 determines whether or not there is an event, by referring to the event ID. Then, if it is determined that the event ID is "0" (i.e., no event), the event occurrence time point determination unit 114 directly advances the process to a step S613 by skipping over steps S607 to S612.

On the other hand, if it is determined that the event ID is not "0", in the step S607, the event occurrence time point determination unit 114 determines whether or not the event is an event of a detection-delayed type. Here, the event of the detection-delayed type is the event that the detection is performed after the hour when the event occurred. For example, "misplacement" and "carrying-away" are included in the event of the detection-delayed type. The PC 110 has previously stored the event ID of the event of the detection-delayed type in the form of a table in the RAM 803, the ROM 802, the external storage apparatus 806 or the like. Thus, the event occurrence time point determination unit 114 can detect whether or not the detected event is the event of the detection-delayed type, by referring to the table. If it is determined that the detected event is the event of the detection-delayed type, the event occurrence time point determination unit 114 advances the process to a step S608. On the other hand, if it is determined that the detected event is not the event of the detection-delayed type, the event occurrence time point determination unit 114 advances the process to a step S609.

In the step S608, the event occurrence time point determination unit 114 reads, from the video accumulation unit 113, the frame image at the hour (frame number) obtained by subtracting the existing time (the number of frames) from the current hour (current frame number). Thus, the read frame image is the frame image at the time when the event occurs. If the event is the misplacement, the read frame image is the frame image at the time when the misplacement occurs. On the other hand, as in the intrusion, if timing of the occurrence of the event corresponds to timing of the detection of the event, in the step S609, the event occurrence time point determination unit 114 obtains the frame image of the current hour (current frame number) from the video accumulation unit 113.

Next, in a step S610, the display unit 115 displays, on the display 807 or the like, a window which includes the frame image at the time when the event occurs.

FIG. 9B illustrates one example of the window to be displayed as a popup at the time of warning.

When the event occurs, the display unit 115 displays a sub window 700 as a popup, independently of the main window 300. Here, the sub window 700 includes an area 702 for displaying the frame image at the time when the event occurs, a bar 702 for displaying a message indicating a classification of the event as described later, and a frame 703 which indicates the circumscribed rectangle of the object area with which the event is associated as described later and is superposed on the frame image. Incidentally, FIG. 9B illustrates the example of the window to be displayed when the misplacement is detected.

The description now returns to FIG. 8. In a step S611, the display unit 115 displays the frame 703 indicating the circumscribed rectangle by superposing it on the frame image at the time when the event occurs, by referring to the circumscribed rectangle included in the object meta data currently processed.

Next, in the step S612, the display unit 115 displays on the bar 702 the message indicating the classification of the event, such as "MISPLACEMENT IS DETECTED!", "MISPLACEMENT EVENT DETECTION OCCURS!", or the like.

Next, in the step S613, the event occurrence time point determination unit 114 performs decrement of "N". Then, in a step S614, the event occurrence time point determination unit 114 determines whether or not "N" becomes "0". That is, the PC 110 performs the processes from the step S605 to the step S612 for all the object meta data.

Incidentally, it should be noted that the purpose of displaying the frame in the step S611 and the message in the step S612 is to enable the user to easily understand the displayed contents. Therefore, the PC 110 may only display the frame image at the time when the event occurs, by omitting the processes in the steps S611 and S612. In such a case, the coordinates of the circumscribed rectangle of the object meta data is unnecessary.

As just described, the camera 100 detects the existing time of the object and the event, and outputs them as the meta data. Thus, in the case where the event is the event of the detection-delayed type, the PC 110 can display the video at the time of the event occurrence on the basis of the existing time and the current hour. Therefore, the user can easily grasp the aspect at the time when the event occurred. For example, if the event is the misplacement, since it is possible to display the video at the time when the person misplaced the object, the user can easily confirm who misplaced the object.

FIG. 10 is a block diagram illustrating an example of a system configuration of an image processing system according to the second embodiment, and functional constitutions of apparatuses included in the image processing system.

Here, in the second embodiment, the constituent elements that are the same as those in the first embodiment are added with the same numerals respectively, and the descriptions thereof will be omitted.

However, in the second embodiment, the event detection unit 104 considers, as an event, the time point when an object appears in the frame image, and detects "appearance" as the event. In the object detection unit 103, when the object appears in the frame image, "the number of times of appearance"="1" is given, and "the existing time"="0" is given, whereby it is possible to easily detect such an appearance event. Incidentally, in the second embodiment, the object existing time in the meta data is unnecessary, because it is not used.

In the second embodiment, a meta data accumulation unit 1116 is additionally provided in the PC 110. Here, the meta data accumulation unit 1116, which is constituted by the external storage apparatus 806 or the RAM 803, sequentially accumulates the meta data analyzed by the event occurrence time point determination unit 114.

Subsequently, the process to be performed by the PC 110 will be described with reference to FIG. 11. That is, FIG. 11 is the flow chart for describing the process to be performed by the PC according to the second embodiment.

Here, in this flow chart of the second embodiment, the steps that are the same as those in the flow chart of the first embodiment are added with the same step numbers respectively, and the descriptions thereof will be omitted.

In a step S1301, the event occurrence time point determination unit 114 determines whether or not an event other than "appearance" is detected, by referring to the event ID. If it is determined that the event other than "appearance" is detected, the event occurrence time point determination unit 114 advances the process to the step S607. On the other hand, if it is determined that the event other than "appearance" is not detected, the event occurrence time point determination unit 114 advances the process to the step S613. More specifically, it is assumed that the event ID of "appearance" is "99". In this case, if the event ID="0" (no event) or the event ID="99", the event occurrence time point determination unit 114 advances the process to the step S613.

If it is determined that the event other than "appearance" is detected, in the step S607, the event occurrence time point determination unit 114 determines whether or not the event is the event of the detection-delayed type. If it is determined that the event is the event of the detection-delayed type, the event occurrence time point determination unit 114 advances the process to a step S1302. On the other hand, if it is determined that the event is not the event of the detection-delayed type, the event occurrence time point determination unit 114 advances the process to the step S609.

In the step S1302, the event occurrence time point determination unit 114 searches for, from among the object meta data of the objects at the same position, the object meta data having the "appearance" event, by referring to the circumscribed rectangles of the past meta data from the meta data accumulation unit 1116. Incidentally, the event occurrence time point determination unit 114 determines, based on whether or not the central positions of the two circumscribed rectangles are within a predetermined value, whether or not the two objects are at the same position. The event occurrence time point determination unit 114 obtains, by referring to the frame meta data including the object meta data having the "appearance" event, the hour (frame number) of the relevant frame, that is, the hour (event occurrence time) when the object appears. Incidentally, the object here is the misplaced object, and the hour when the misplaced object occurs is the hour at the time point when the misplacement occurs. Thus, in a step S1303, the event occurrence time point determination unit 114 reads the frame image at the appearance hour from the video accumulation unit 113. Here, the hour of the frame (frame number) is one example of hour information. After the processes in the steps S600 to S614, in a step S1304, the event occurrence time point determination unit 114 accumulates the meta data being the target of the process in the meta data accumulation unit 1116.

As above, the misplacement is exemplarily described. However, for example, in the case where carrying-away occurs, the event occurrence time point determination unit 114 may detect as the event the time point when the object is "carried away", and add the detected event to the meta data. Incidentally, in the object detection unit 103, the object is detected based on a difference between the object and the background image. For this reason, also in the case where the previously existing object is carried away (disappeared), the relevant object is detected as the carried away (disappeared) object. Therefore, even in the case of "carrying-away", it is possible to perform the above-described processes as well as the case of "misplacement".

As just described, the camera 100 is constituted to also detect "appearance" as the event and thus output the detected event as the meta data together with the position of the object. Thus, in the case of the event of the detection-delayed type, the PC 110 can display the video at the appearance hour (event occurrence time point) by searching for the meta data of the objects at the same position and having the "appearance" event from the accumulated meta data. Therefore, a user can easily grasp an aspect at the time point of the occurrence of the event. For example, if the event is the "misplacement", it is possible to display the video at the time point when a person misplaced the object, whereby the user can easily confirm who misplaced the object.

Figure 12:
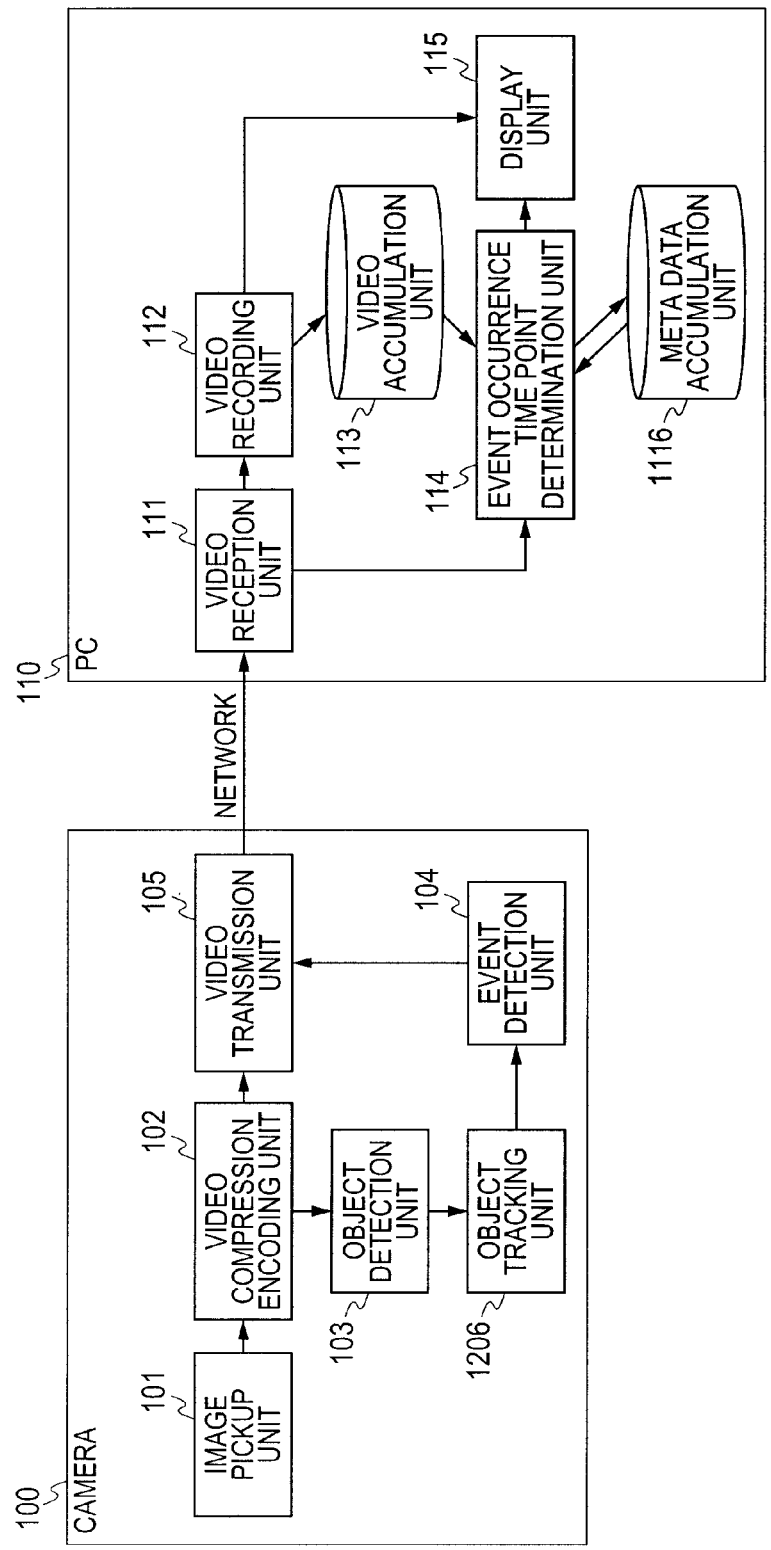
FIG. 12 is a block diagram illustrating an example of a system configuration of an image processing system according to the third embodiment, and functional constitutions of apparatuses included in the image processing system.

FIG. 12 is a block diagram illustrating an example of a system configuration of an image processing system according to the third embodiment, and functional constitutions of apparatuses included in the image processing system.

Here, in the third embodiment, an object tracking unit 1206 is added to the camera 100 according to the second embodiment. Thus, the constituent elements that are the same as those in the second embodiment (and the first embodiment) are added with the same numerals respectively, and the descriptions thereof will be omitted.

Figure 13:
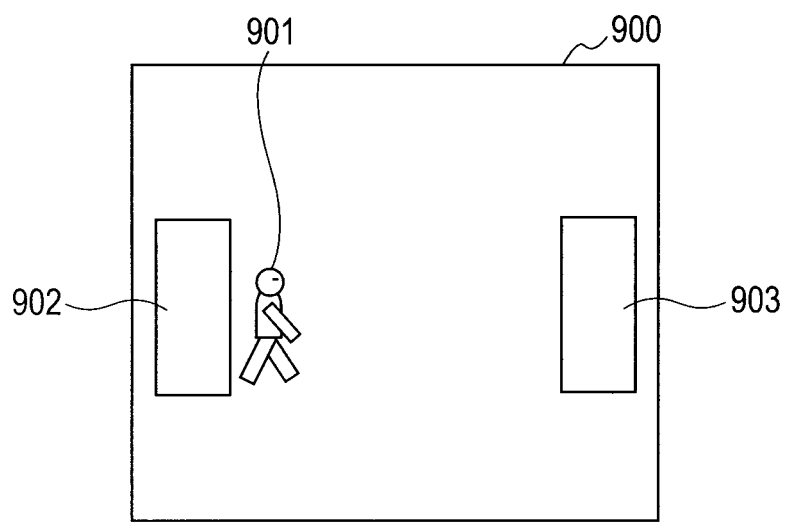
FIG. 13 is a diagram for describing a specific entrance and exit event.

In the present embodiment, since the object tracking unit 1206 is additionally provided, it is possible to confirm whether or not the object is the same object even in a case where the relevant object is moving. Thus, for example, as illustrated in FIG. 13, in a case where the camera 100 detects, as a specific entrance and exit event (entrance and exit phenomenon), a case where a person enters a room through a specific door 902 and then exits through a specific door 903, the PC 110 can display a momentary video that the person entered the room. Here, it should be noted that FIG. 13 is the drawing for describing the specific entrance and exit event.

Figure 14:
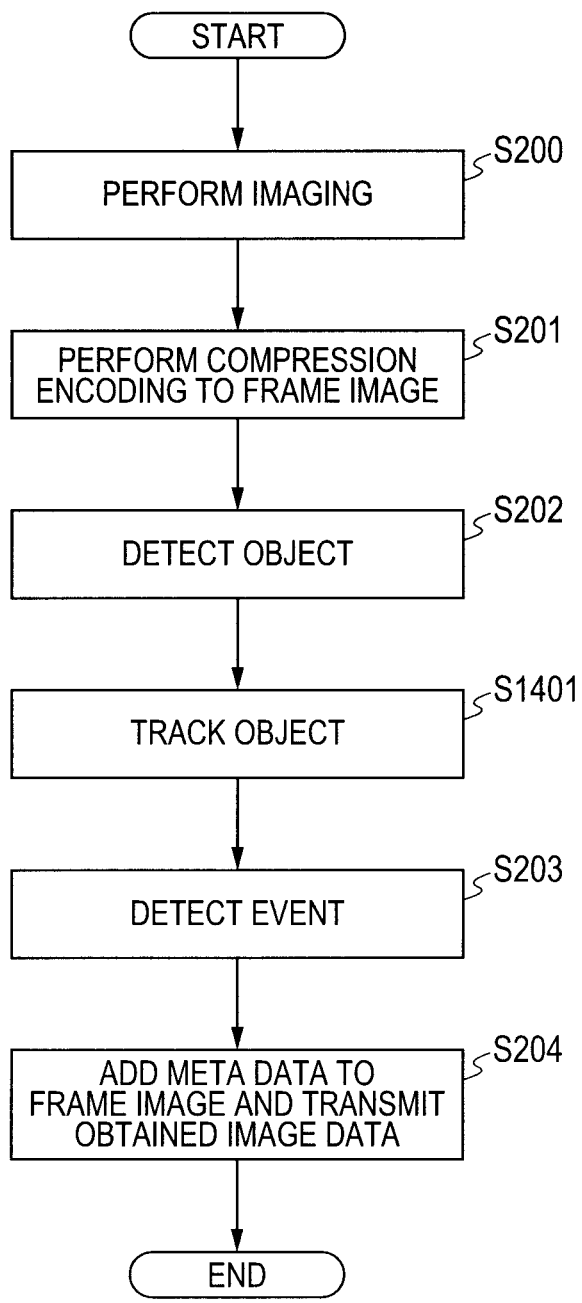
FIG. 14 is a flow chart for describing a process to be performed by a camera according to the third embodiment.

The process to be performed at that time by the camera 100 will be described with reference to FIG. 14. That is, FIG. 14 is the flow chart for describing the process to be performed by the camera according to the third embodiment.

However, in this flow chart of the third embodiment, the steps same as those in the flow chart of the first embodiment are added with the same step numbers respectively, and the descriptions thereof will be omitted. That is, in the third embodiment, after the object is detected in the same manner as that in the first embodiment, the object tracking unit 1206 tracks in a step S1401 which object in the past frame corresponds to which object in the current frame. Further, the object tracking unit 1206 gives the same object ID to the corresponding object (step S1401). Then, in the step S204, the object ID is given or added as the object meta data of the output meta data. Here, the object ID is one example of object discrimination information.

The detail of the process to be performed by the object tracking unit 1206 will be described.

The object tracking unit 1206 reads the object information stored, by the object detection unit 103, in the RAM of the camera 100 by an amount corresponding to a past predetermined time, and then obtains the central position of the object of the past frame and the central position of the object of the current frame. Next, the object tracking unit 1206 obtains the distances between the central positions of the objects of the past frame and the central positions of the objects of the current frame for all the combinations of the objects of the past frame and the objects of the current frame. Subsequently, the object tracking unit 1206 considers, as the same object, the objects included in the combination of the objects of the past and current frames that the distance between their centers is shortest, and assigns or adds the same object ID to these objects.

Incidentally, in the above-described process, the object tracking unit 1206 considers, as the same object, the two objects whose distance between them is shortest. However, the object tracking unit 1206 may consider these objects as the same object, in another way. For example, the object tracking unit 1206 may extract features such as luminance, color tint and the like from the detected object area, and consider, as the same object, the objects having the similar features.

Figure 15:
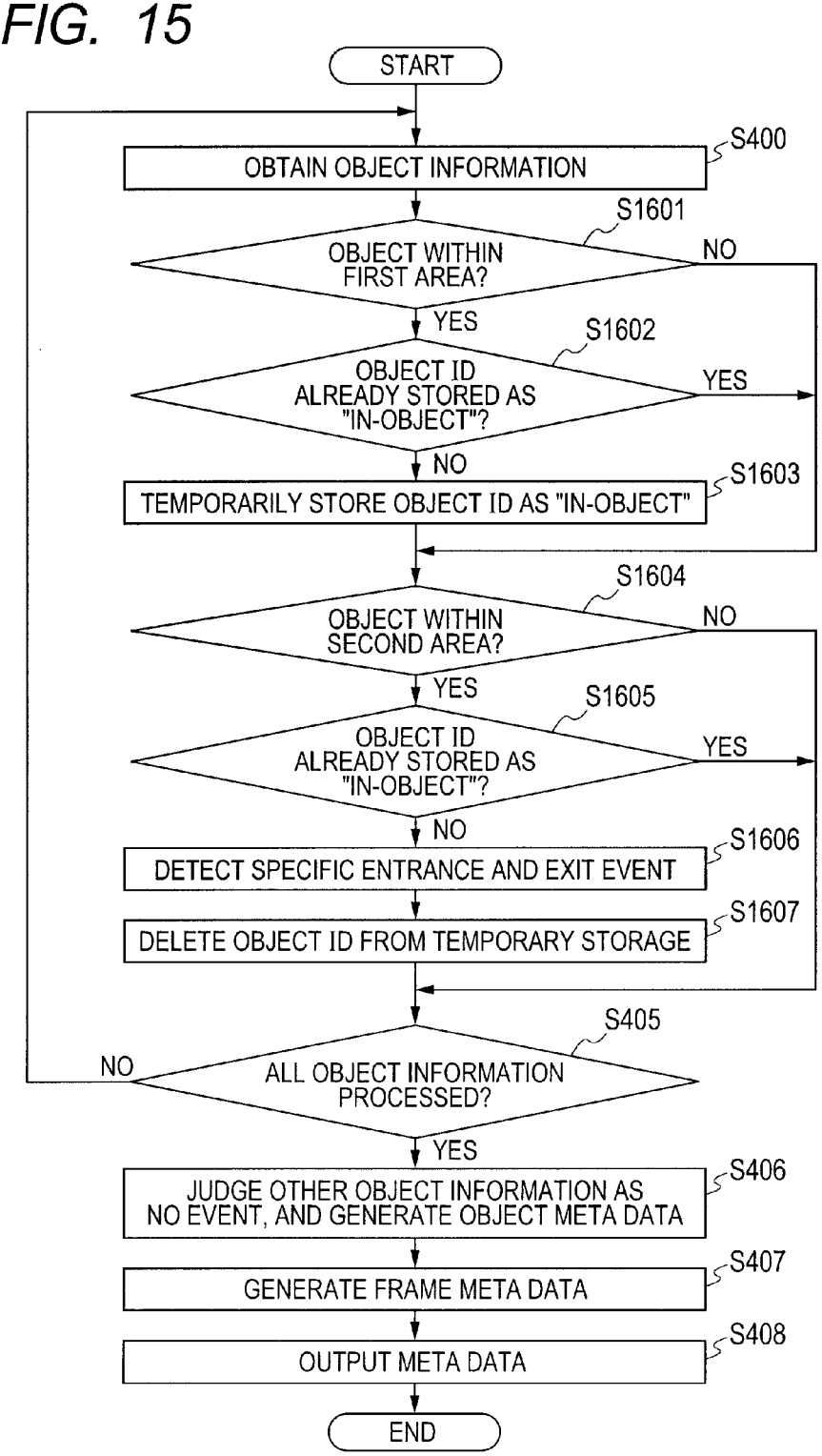
FIG. 15 is a flow chart indicating an example of a process of detecting specific entrance and exit as an event.

Next, the detail of the process to be performed to detect the specific entrance and exit event in the event detection unit 104 will be described with reference to a flow chart illustrated in FIG. 15. That is, FIG. 15 is the flow chart indicating an example of the process of detecting specific entrance and exit as the event. Here, the specific entrance and exit event will be defined anew with reference to FIG. 13, which illustrates an overall frame image 900, the doors 902 and 903, and a person 901. Here, only in a case where the person 901 enters the room through the door 902 and then exits through the door 903, this phenomenon is defined as the specific entrance and exit event. To detect this event, the user previously designates the areas of the doors 902 and 903.

Next, the process to be performed will be described. However, in this flow chart, the steps that are the same as those in the flow chart of FIG. 6 according to the first embodiment are added with the same step numbers respectively, and the descriptions thereof will be omitted.

In a step S1601, the event detection unit 104 determines whether or not the object exists within the area of the door 902, by referring to the coordinates of the circumscribed rectangle in the object information obtained in the step S400. If it is determined that the object exists within the area of the door 902, the event detection unit 104 advances the process to a step S1602. On the other hand, if it is determined that the object does not exist within the area of the door 902, the event detection unit 104 advances the process to a step S1604.

If the object exists within the area of the door 902, there is a possibility that the relevant object is the object (person) which entered the room through the door 902. Thus, in the step S1602, the event detection unit 104 determines whether or not the object ID has been temporarily stored in the RAM of the camera 100 as an already "in-object" (i.e., the person who entered the room). Then, if it is determined that the object ID has been already stored as the "in-object", the event detection unit 104 advances the process to the step S1604. On the other hand, if it is determined that the object ID is not stored as the "in-object", the event detection unit 104 advances the process to a step S1603.

In the step S1603, the event detection unit 104 temporarily stores, as the "in-object", the object ID of the currently processed object information in the RAM of the camera 100.

In the step S1604, the event detection unit 104 determines whether or not the object exists within the area of the door 903, by referring to the coordinates of the circumscribed rectangle in the object information. If it is determined that the object exists within the area of the door 903, the event detection unit 104 advances the process to a step S1605. On the other hand, if it is determined that the object does not exist within the area of the door 903, the event detection unit 104 advances the process to the step S405.

If the object exists within the area of the door 903, there is a possibility that the relevant object is the object (person) which intends to exit through the door 903. Thus, in the step S1605, the event detection unit 104 determines whether or not the object ID of the currently processed object information has been temporarily stored already as the "in-object" in the RAM of the camera 100. This is the important determination to discriminate the person who intends to exit from the person who entered through the door 903. Then, if it is determined that the object ID has been already stored as the "in-object", the event detection unit 104 advances the process to the step S405. On the other hand, if it is determined that the object ID is not stored as the "in-object", the event detection unit 104 advances the process to the step S1606.

If the object ID is the object ID which has been already stored temporarily as the "in-object", the relevant object is the person who entered through the door 902 and intends to exit through the door 903. Therefore, in the step S1606, the event detection unit 104 detects the specific entrance and exist event, and adds the predetermined event ID to the object meta data. Incidentally, as well as the second embodiment, the object existing time in the meta data is not used in the third embodiment, whereby the meta data may not include the object existing time.

In a step S1607, the event detection unit 104 deletes the currently processed object ID stored as the "in-object", from the RAM of the camera 100.

Figure 16:
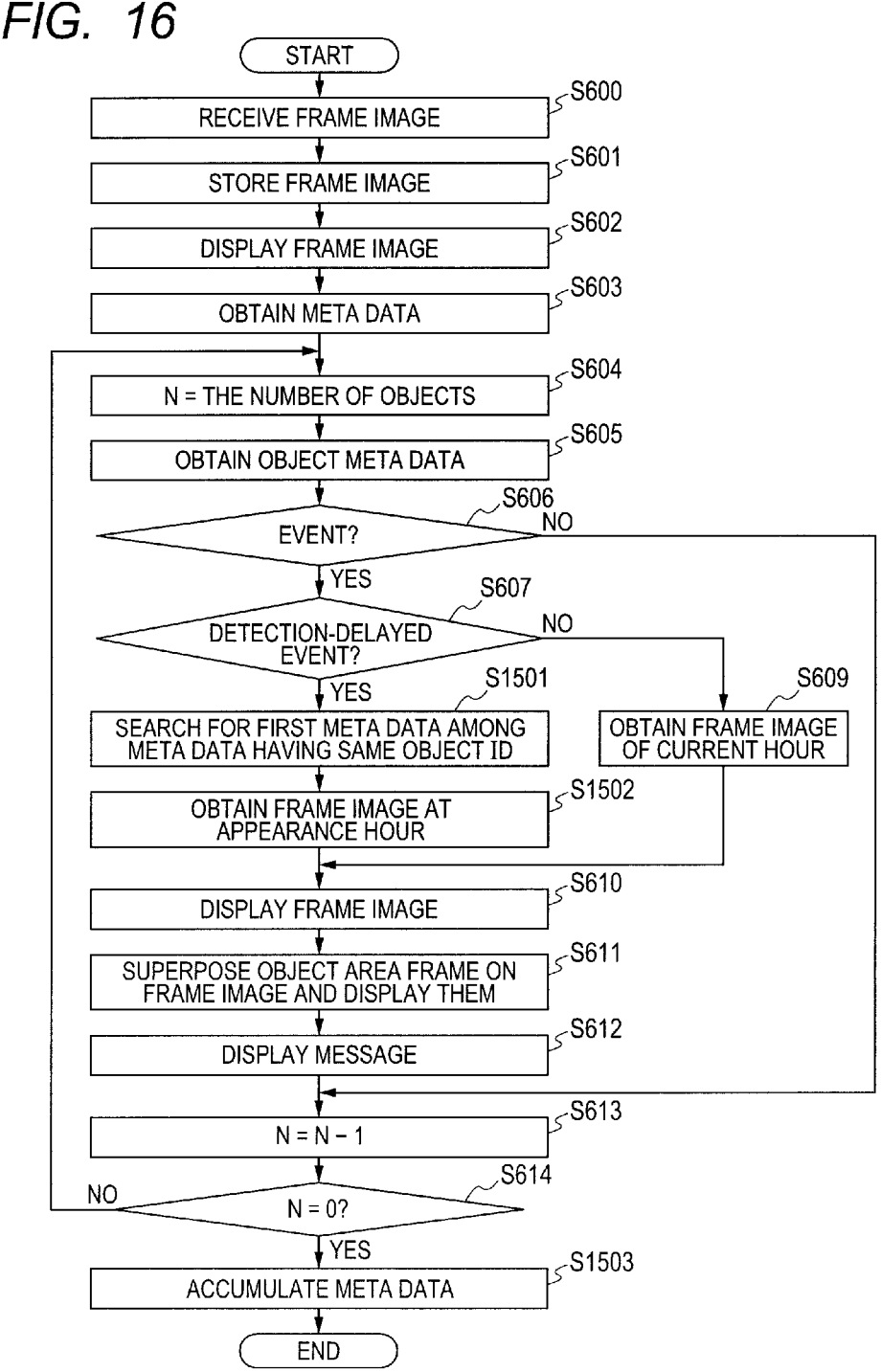
FIG. 16 is a flow chart for describing a process to be performed by a PC according to the third embodiment.

Next, the process to be performed by the PC 110 will be described with reference to a flow chart illustrated in FIG. 16. That is, FIG. 16 is the flow chart for describing the process to be performed by the PC according to the third embodiment.

However, in this flow chart, the steps that are the same as those in the flow chart according to the first embodiment are added with the same step numbers respectively, and the descriptions thereof will be omitted.

In a step S1501, the event occurrence time point determination unit 114 searches for first object meta data which includes the object ID same as the object ID of the object being the target of the current process, by referring to the object ID of the past meta data in the meta data accumulation unit 1116. The event occurrence time point determination unit 114 refers to the frame meta data corresponding to the first object meta data for the same object. Thus, the event occurrence time point determination unit 114 can obtain the hour (frame number) of the relevant frame, i.e., the hour when the object appeared. Here, in the present embodiment, the object is the misplaced object, and the hour when the misplaced object occurred is, i.e., the hour when the misplacement occurred. Thus, the event occurrence time point determination unit 114 reads the frame image at the appearance hour from the video accumulation unit 113 (step S1502).

After the processes in the steps S600 to S614, in a step S1503, the event occurrence time point determination unit 114 accumulates the meta data being the target of the process in the meta data accumulation unit 1116.

As described above, even if the object is the moving object, it is possible to discriminate whether the target objects are the same object by additionally providing the object tracking unit 1206 to the camera 100. The camera 100 outputs the object ID in the form of the meta data as the information indicating that the target objects have been considered as the same object. Thus, in the case of the event of the detection-delayed type, the PC 110 can display the video at the object appearance hour (event occurrence time point) by searching for the first meta data of the same object from the accumulated meta data. Therefore, a user can easily grasp an aspect at the time point of the occurrence of the event. For example, if the event is the specific entrance and exist event, it is possible to display the video at the time point when a person enters, whereby the user can easily confirm who entered the room.

In the first to third embodiments, as described with reference to FIG. 8, if the event is the event of the detection-delayed type such as the misplacement detection, the PC 110 displays the frame image at the time of the occurrence of the misplacement (steps S608, S610). However, the PC 110 may display not only one frame image at the time of the occurrence of the misplacement, but also display sequentially plural frame images included in a predetermined interval between a time immediately before the occurrence of the misplacement and a time immediately after the occurrence of the misplacement. By doing so, the user can further confirm in detail the aspect at the time when the misplacement occurred. Incidentally, the interval may be determined by either a method of always using a fixed time (for example, one second before and two second after the time point of occurrence) as the interval or a method of using a fixed time determined according to the classification of event (for example, one second before and two second after the occurrence of the misplacement, three seconds after the occurrence of the carrying-away, or the like).

Further, in the first to third embodiments, the warning screen as illustrated in FIG. 9B is displayed as the popup. However, of course, the screen to be displayed is not limited to this. That is, the frame image at the time of the occurrence of the event may be presented to the user. For example, the PC 110 may dispose the frame image at the time of the occurrence of the event, nearby the current image of the camera within the main window.

Further, although the existing time is used in the first embodiment, the PC 110 may of course us the occurrence hour (mode creation hour) as it is.

Furthermore, in the first to third embodiments, the object detection unit 103 performs the object detection by using the feature amount (DCT coefficient) generated when the encoding is performed by the video compression encoding unit 102. However, of course, the object detection unit 103 may directly extract the feature amounts such as luminance, an edge, color tint and the like from the image data imaged and obtained by the image pickup unit 101. Further, the block is not limited to the 8×8 pixels. That is, the block may be N×N pixels (N is an arbitrary number), N×M pixels (N, M are arbitrary numbers, but N≠M). Furthermore, the object detection unit 103 may perform the object detection process for each pixel.

Furthermore, in the first to third embodiments, the object detection unit 103 has the plural modes. However, if high accuracy is not required in such a case where the camera is used in the stable circumstances, the object detection unit 103 may use only a single mode. In this case, it is unnecessary to hold the active mode and the number of times of appearance in the mode.

Furthermore, in the first to third embodiments, the object detection unit 103 has the DCT coefficient itself as the feature amount in the mode. However, the object detection unit 103 may have, in the mode, the difference amounts respectively obtained in the above-described equations (1) to (3). In this case, the object detection unit 103 may determine whether or not the similar mode exists (step S302), by determining whether or not the difference between the difference amounts is within a threshold.

Furthermore, in the first to third embodiments, the object detection unit 103 discriminates whether the area is the background or the foreground (step S312), after merging the blocks having the same existing time (step S311). However, the object detection unit 103 may merge only the blocks respectively having the existing times longer than a predetermined time.

Furthermore, in the first to third embodiments, the number of times of appearance is included in the mode. This may not be included in the mode, if the activity ratio is not used in the event detection unit 104.

Furthermore, in the case where the object tracking unit 1206 is additionally provided in the camera 100, the object detection unit 103 may detect the object by obtaining a difference amount from the background image by a difference of luminance for each pixel, and combining the pixels having the same difference amount.

Furthermore, in the first to third embodiments, the camera 100 and the PC 110 mutually exchange the meta data in the communication. On the other hand, the video compression encoding unit 102, the object detection unit 103 and the event detection unit 104 may be provided on the side of the PC 110. In such a case, the video transmission unit 105, the network and the video reception unit 111 are unnecessary in the image processing system. Incidentally, in the constitution like this, it is necessary to further add a video interface to the PC 110 to be able to capture the frame image from the camera 100 through a coaxial cable or the like.

As just described, according to the embodiments of the present invention, even if the event is detected after the occurrence of the relevant event, the PC 110 can display the video at the time of the occurrence of the relevant event. For this reason, the user can easily grasp the aspect at the time point of the occurrence of the relevant event. For example, in case of the misplacement, since the PC 110 can display the video at the time point when the person misplaced the object, the user can confirm who misplaced the object.

That is, according to the above-described embodiments, it is possible to perform the display by which the user can easily confirm the event, even if the timing of the event detection is different from the timing of the event occurrence.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or an apparatus (or a device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240655, filed Oct. 19, 2009, which is hereby incorporated by reference herein in its entirety.

What is claimed is:

1. An image pickup apparatus comprising:
    an object detection unit configured to detect an object included in a frame image of video data on the basis of a feature amount of the frame image;
    an event detection unit configured to detect a misplacement event of the object based on an activity state and an existing time of the object, and to generate event information including the existing time of the object and an identifier of the frame image in which the misplacement event of the object has been detected;
    a storage control unit configured to store in a storage device the frame image and the event information;
    a determination unit configured to determine an event occurrence time at which the misplacement event occurred based on the identifier of the frame image in which the misplacement event has been detected and the existing time of the object in the event information; and
    display control unit configured to obtain the frame image corresponding to the determined event occurrence time from the storage device and display the obtained frame image corresponding to the determined event occurrence time on a display device.

2. An image pickup apparatus according to claim 1, wherein the event information includes event discrimination information for discriminating the event.

3. An image pickup apparatus according to claim 2, wherein the event information further includes coordinate information concerning the position of the object and time information of the frame image.

4. An image pickup apparatus according to claim 1, wherein
the object detection unit detects a size of the object; and
the event detection unit detects the misplacement event of the object based on the size of the object.

5. An information processing method comprising:
causing an image pickup apparatus to detect an object included in a frame image of video data on the basis of a feature amount of the frame image;
causing the image pickup apparatus to detect a misplacement event of the object based on an activity state and an existing time of the object, and generate event information including the existing time of the object and an identifier of the frame image in which the misplacement event of the object has been detected;
storing in a storage device the frame image and the event information;
determining an event occurrence time at which the misplacement event occurred based on the identifier of the frame image in which the misplacement event has been detected and the existing time of the object in the event information; and
obtaining the frame image corresponding to the determined event occurrence time from the storage device and display the obtained frame image corresponding to the determined event occurrence time on a display device.

6. A non-transitory storage medium which stores a program to cause a computer to function as:
an object detection unit configured to detect an object included in a frame image of video data on the basis of a feature amount of the frame image;
an event detection unit configured to detect a misplacement event of the object based on an activity state and an existing time of the object, and generate event information including the existing time of the object and an identifier of the frame image in which the misplacement event of the object has been detected;
a storage control unit configured to store in a storage device the frame image and the event information;
a determination unit configured to determine an event occurrence time at which the misplacement event occurred based on the identifier of the frame image in which the misplacement event has been detected and the existing time of the object in the event information; and
display control unit configured to obtain the frame image corresponding to the determined event occurrence time from the storage device and display the obtained frame image corresponding to the determined event occurrence time on a display device.

* * * * *